US010044936B2

(12) United States Patent
Ryu et al.

(10) Patent No.: US 10,044,936 B2
(45) Date of Patent: Aug. 7, 2018

(54) METHOD AND APPARATUS FOR ESTIMATING MOTION IN VIDEO, METHOD AND APPARATUS FOR STABILIZING VIDEO, AND COMPUTER-READABLE RECORDING MEDIUM

(71) Applicant: Hanwha Techwin Co., Ltd., Changwon-si (KR)

(72) Inventors: Yeongeol Ryu, Changwon-si (KR); Sangji Park, Changwon-si (KR); Junho Cha, Changwon-si (KR); Seungin Noh, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 62 days.

(21) Appl. No.: 15/065,167

(22) Filed: Mar. 9, 2016

(65) Prior Publication Data

US 2017/0078576 A1    Mar. 16, 2017

(30) Foreign Application Priority Data

Sep. 16, 2015  (KR) ........................ 10-2015-0131056

(51) Int. Cl.
*H04N 5/232* (2006.01)
(52) U.S. Cl.
CPC ..... *H04N 5/23267* (2013.01); *H04N 5/23254* (2013.01); *H04N 5/23258* (2013.01); *H04N 5/23261* (2013.01)

(58) Field of Classification Search
CPC ........... H04N 5/23267; H04N 5/23254; H04N 5/23258; H04N 5/23261
See application file for complete search history.

(56) References Cited

U.S. PATENT DOCUMENTS

| 8,488,010 | B2 | 7/2013 | Voss et al. | |
|---|---|---|---|---|
| 8,570,385 | B2 | 10/2013 | Yamada et al. | |
| 2003/0117611 | A1* | 6/2003 | Chon | G06T 7/80 356/5.01 |
| 2005/0249426 | A1* | 11/2005 | Badawy | G06T 9/001 382/241 |
| 2006/0280248 | A1* | 12/2006 | Kim | H04N 21/234309 375/240.16 |
| 2008/0095402 | A1* | 4/2008 | Kochi | G01C 11/00 382/103 |

(Continued)

FOREIGN PATENT DOCUMENTS

| KR | 10-0956226 B1 | 5/2010 |
|---|---|---|
| KR | 10-1058332 B1 | 8/2011 |

*Primary Examiner* — Abdelaaziz Tissire
(74) *Attorney, Agent, or Firm* — Sughrue Mion, PLLC

(57) ABSTRACT

A method of stabilizing a video is provided. The method includes detecting a feature point from a first frame; predicting a location of the feature point in a second frame based on a location of the feature point in the first frame and a predetermined parameter; detecting the feature point from the second frame; determining a distance between the predicted location and a location of the feature point detected from the second frame; and updating the parameter based on a location difference between the feature point detected in the first frame and the feature point detected in the second frame, in response to determining that the distance is within a predetermined threshold.

13 Claims, 7 Drawing Sheets

(56) References Cited

U.S. PATENT DOCUMENTS

| | | | |
|---|---|---|---|
| 2008/0246848 A1* | 10/2008 | Tsubaki | G06T 7/20 348/208.4 |
| 2010/0134640 A1* | 6/2010 | Kuo | G06T 7/20 348/208.6 |
| 2011/0012989 A1* | 1/2011 | Tseng | G03B 17/20 348/36 |
| 2011/0157379 A1* | 6/2011 | Kimura | H04N 5/23248 348/208.2 |
| 2011/0216201 A1* | 9/2011 | McAndrew | G06T 7/0018 348/148 |
| 2012/0120264 A1* | 5/2012 | Lee | G06T 7/20 348/208.4 |
| 2013/0120641 A1* | 5/2013 | Nagaoka | H04N 5/23212 348/345 |
| 2015/0008294 A1* | 1/2015 | Desbordes | B61L 25/021 246/122 R |
| 2015/0015727 A1* | 1/2015 | Ryu | H04N 5/23254 348/208.1 |
| 2015/0206290 A1* | 7/2015 | Ryu | G06T 5/003 382/255 |
| 2016/0286130 A1* | 9/2016 | Ryu | H04N 5/23267 |
| 2017/0026581 A1* | 1/2017 | Ryu | G06K 9/6211 |
| 2017/0078575 A1* | 3/2017 | Ryu | G06T 7/277 |
| 2017/0163895 A1* | 6/2017 | Ryu | H04N 5/23267 |
| 2017/0264824 A1* | 9/2017 | Kuchiki | G06T 7/11 |

* cited by examiner

FIG. 2A
FIG. 2B
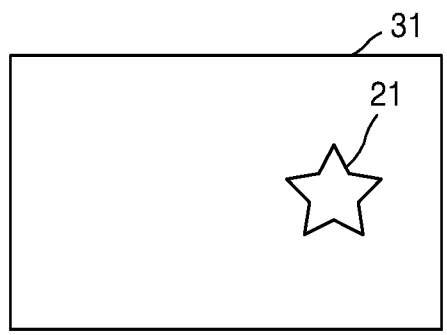
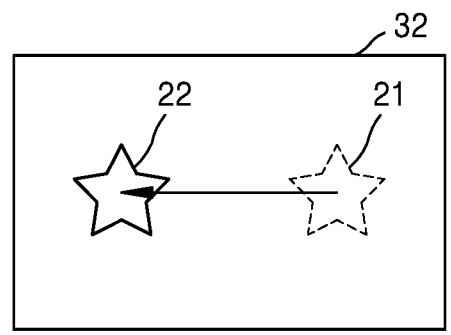

METHOD AND APPARATUS FOR ESTIMATING MOTION IN VIDEO, METHOD AND APPARATUS FOR STABILIZING VIDEO, AND COMPUTER-READABLE RECORDING MEDIUM

CROSS-REFERENCE TO THE RELATED APPLICATION

This application claims priority from Korean Patent Application No. 10-2015-0131056, filed on Sep. 16, 2015, in the Korean Intellectual Property Office, the disclosure of which is incorporated herein in its entirety by reference.

BACKGROUND

1. Field

Methods and apparatuses consistent with exemplary embodiments relate to estimating image motion, a method and apparatus for stabilizing a video, and a computer-readable recording medium.

2. Description of the Related Art

An imaging system using a pan-tilt-zoom (PTZ) camera is widely used for access control or crime prevention. A PTZ camera has a support that moves in up/down/left/right directions, and a zoom ratio of the PTZ camera may be adjusted. The area monitored by a PTZ camera may be changed by pointing the PTZ camera in another direction via a panning operation, i.e., horizontally rotating the PTZ camera up to 360 degrees, and a tilting operation, i.e., vertically rotating the PTZ camera up to 180 degrees. Also, the PTZ camera may zoom in/out on a subject by varying a zoom ratio of a zoom lens. As such, the PTZ camera may cover a large area, so the PTZ camera is drawing attention of a surveillance system industry.

However, a view may be blurred due to shaking or rotating of the PTZ camera, which requires a proper video stabilization process.

SUMMARY

Methods and apparatuses consistent with exemplary embodiments may estimate image motion to stabilize a video so as to remove the effect of shaking view, which may be generated by unintentional rotation of a camera.

According to an aspect of an exemplary embodiment, there is provided a method of stabilizing a video, the method including: detecting a feature point from a first frame; predicting a location of the feature point in a second frame based on a location of the feature point in the first frame and a predetermined parameter; detecting the feature point from the second frame; determining a distance between the predicted location and a location of the feature point detected from the second frame; and updating the parameter based on a location difference between the feature point detected in the first frame and the feature point detected in the second frame, in response to determining that the distance is within a predetermined threshold.

The video may be recorded by a camera which is rotatable in at least one axis direction, and wherein the parameter indicates a relationship between an angular velocity of the camera, which is measured between a time point when the first frame is captured and a time point when the second frame is captured, and pixel movement between the first frame and the second frame.

The predicting may include: acquiring the angular velocity of the camera sensed by a gyro sensor; estimating the location difference by multiplying the angular velocity by the parameter; and predicting the location of the feature point in the second frame based on the location of the feature point detected from the first frame and the estimated location difference.

The updating may include updating the parameter based on the angular velocity.

The updating may include: calculating a new parameter based on the location difference and the angular velocity; and updating the parameter with the new parameter.

The updating may include updating the parameter based on a ratio of the location difference to the angular velocity.

The acquiring may include receiving a plurality of instantaneous angular velocities of the camera that are consecutively sensed between a time point when the first frame is captured and a time point when the second frame is captured, and wherein the determining a location difference may include calculating an average angular velocity of the plurality of instantaneous angular velocities and multiplying the average angular velocity by the parameter.

The parameter may be dependent on a focal length of the camera.

The detecting of the feature point from the first frame, the predicting, the detecting the feature point from the second frame, the determining, and the updating may be performed regarding a plurality of feature points including the feature point.

The updating may include estimating the location difference based on a vector defined by the location of the feature point detected from the second frame and the location of the feature point detected from the first frame.

The above method may further include correcting the video based on the location difference.

The updating may include: calculating an average of a preset number of recent parameters which are calculated based on the location difference and the angular velocity at different time points; and updating the parameter with the average of the preset number of recent parameters.

According to another aspect of an exemplary embodiment, there is provided an apparatus for stabilizing a video, the apparatus including: a memory; and at least one processor configured to implement: a feature point detector configured to detect a feature point from a first frame; a feature point location predictor configured to predict a location of the feature point in a second frame based on a location of the feature point in the first frame and a predetermined parameter; a feature point tracker configured to detect the feature point from the second frame; a feature point verifier configured to determine a distance between the predicted location and a location of the feature point detected from the second frame; a motion estimator configured to determine a location difference between the feature point detected in the first frame and the feature point detected in the second frame; and an updater configured to update the parameter based on the location difference.

The at least one processor may be further configured to implement a motion corrector configured to correct the video based on the location difference.

According to another aspect of an exemplary embodiment, there is provided a non-transitory computer-readable recording medium having recorded thereon a program for executing any one of the methods described above.

BRIEF DESCRIPTION OF THE DRAWINGS

Various aspects will become apparent and more readily appreciated from the following description of the exemplary embodiments, taken in conjunction with the accompanying drawings in which:

FIGS. 2A and 2B illustrate two frames of a video recorded by an imaging system according to an exemplary embodiment;

DETAILED DESCRIPTION OF EXEMPLARY EMBODIMENTS

Figure 1:
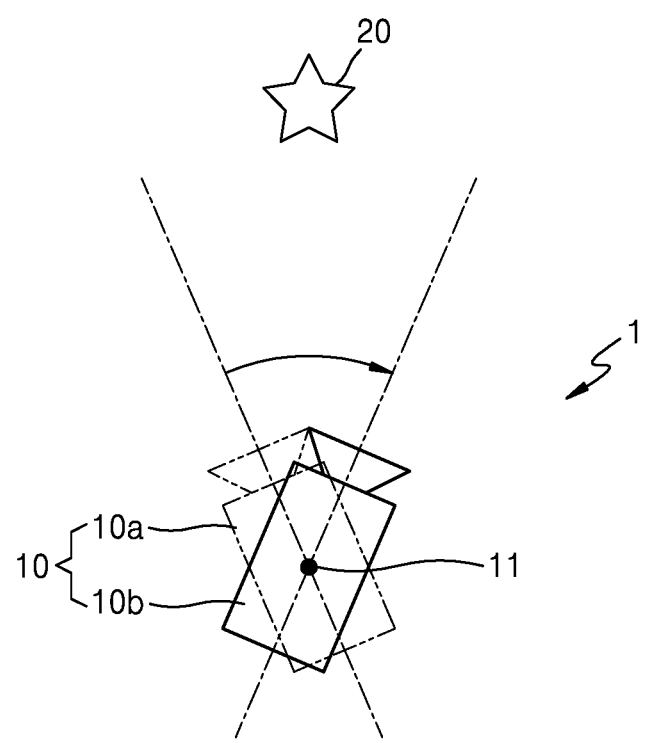
FIG. 1 illustrates an imaging system according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items.

Since the present inventive concept may have various modifications and several embodiments, exemplary embodiments are shown in the drawings and will be described in detail. Advantages, features, and a method of achieving the same will be specified with reference to the embodiments described below in detail together with the attached drawings. However, the embodiments may have different forms and should not be construed as being limited to the descriptions set forth herein.

The embodiments of the present inventive concept will be described below in more detail with reference to the accompanying drawings. Those components that are the same or are in correspondence are rendered the same reference numeral regardless of the figure number, and redundant explanations are omitted.

It will be understood that although the terms "first", "second", etc. may be used herein to describe various components, these components should not be limited by these terms. These components are only used to distinguish one component from another.

Singular expressions, unless defined otherwise in contexts, include plural expressions.

In the embodiments below, it will be further understood that the terms "comprise" and/or "have" used herein specify the presence of stated features or components, but do not preclude the presence or addition of one or more other features or components.

Also, in the drawings, for convenience of description, sizes of elements may be exaggerated or contracted. In other words, since sizes and thicknesses of components in the drawings are arbitrarily illustrated for convenience of explanation, the following embodiments are not limited thereto.

When an embodiment is implementable in another manner, a predetermined process order may be different from a described one. For example, two processes that are consecutively described may be substantially simultaneously performed or may be performed in an opposite order to the described order.

FIG. 1 illustrates an imaging system 1 according to an exemplary embodiment. The imaging system 1 may include a camera 10 which captures a video or an image of a subject 20.

The camera 10 may be rotated in at least one axis direction with respect to a center point 11. For example, the camera 10 may be rotated in a horizontal plane. Further, the camera 10 may be rotated in two axis directions. For example, the camera 10 may be a pan-tilt-zoom (PTZ) camera that may face different directions and thus monitor different areas via a panning operation in which the PTZ camera is horizontally rotated up to 360 degrees and a tilting operation in which the PTZ camera is vertically rotated up to 180 degrees. The PTZ camera may also capture an expanded or reduced view of a subject by varying a zoom ratio of a zoom lens.

The camera 10 may be coupled to a support that is rotatable in at least one axis direction with respect to the center point 11. For example, the support of the camera 10 may be rotated horizontally and vertically. Rotation of the support may be driven by a controller or by a user's manual control.

The camera 10 or the support may include a gyro sensor sensing an angular velocity of the camera 10 in at least one axis direction. If the camera 10 is rotatable in two axis directions, a gyro sensor sensing a rotational angular velocity in two axis directions may be included. An angular velocity sensed by the gyro sensor may have a horizontal component and a vertical component.

The camera 10 may be rotated horizontally or vertically according to control of a controller or a user, but unintended vertical and/or horizontal rotation of the camera 10 may also occur due to shaking of the support or other external factors. When recording a video consisting of a plurality of consecutive frames by using the camera 10, such undesired shaking of the camera 10 may result in shaking the captured image or video. For example, a view of the camera may tremble in a vertical or horizontal direction.

When the camera 10 is rotated in a vertical and/or horizontal direction, a view of the image captured by the camera 10 also moves in the vertical and/or horizontal direction. For example, an image captured by the camera 10 while the camera 10 was in a first state 10a and an image captured by the camera 10 after the camera 10 transitioned to a second state 10b due to horizontal rotation of the camera 10 may have different views of the subject 20. More detailed explanation is provided below with reference to FIGS. 2A and 2B.

FIG. 2A illustrates a first frame 31 captured by the camera 10 in the first state 10a, and FIG. 2B illustrates a second frame 32 captured by the camera 10 in the second state 10b. Referring to FIGS. 2A and 2B, due to the movement of the camera which occurred while capturing the first frame 31 and the second frame 32, a position of the subject 20 changes from a location 21 in the first frame 31 to a location 22 in the second frame 32. Such changes of a subject position in images, i.e., a location difference of pixels between adjacent frames (hereinafter, "image motion"), may result in shaking a camera view in a video including consecutive frames, and thus degrade viewability.

When image motion occurs as illustrated in FIGS. 2A and 2B, a video stabilizing apparatus according to an exemplary embodiment performs video stabilization processing to provide image motion compensation.

While FIGS. 2A and 2B illustrate image motion generated in a horizontal direction as the camera 10 is rotated in a horizontal direction, the direction may be different in exemplary embodiments. For example, when the camera 10 is rotated in a vertical direction, image motion may be generated in a vertical direction, or when the camera 10 is rotated both in vertical and horizontal directions, image motion may be generated in vertical and horizontal directions.

Figure 3:
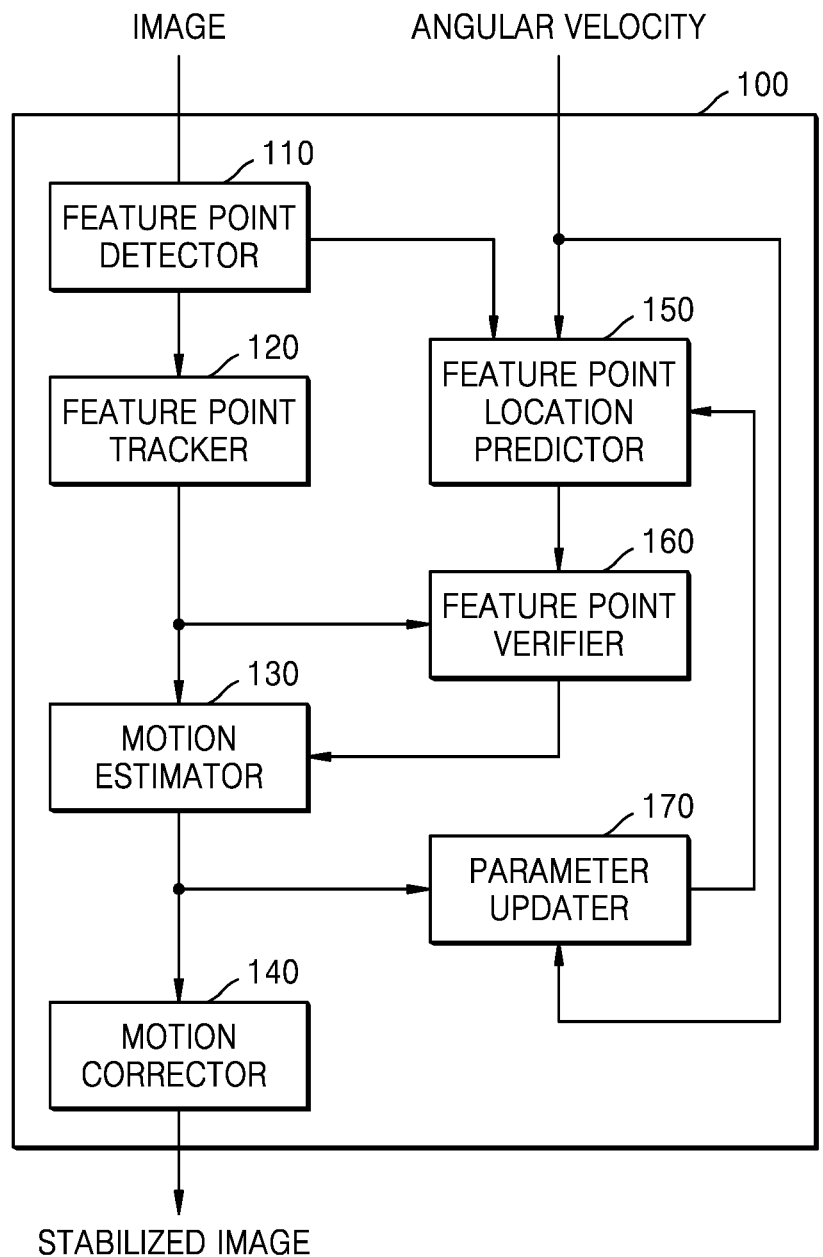
FIG. 3 is a block diagram of an video stabilizing apparatus according to an exemplary embodiment.

FIG. 3 is a schematic structural block diagram of a video stabilizing apparatus 100 according to an exemplary embodiment.

The video stabilizing apparatus 100 performs video stabilization by which image motion is removed.

In FIG. 3, only elements related to the present exemplary embodiment are illustrated in order to prevent obscuring the subject matter of the exemplary embodiment. Thus, it will be obvious to one of ordinary skill in the art that general-use components other than those illustrated in FIG. 3 may be further included in the video stabilizing apparatus 100.

The video stabilizing apparatus 100 may correspond to or include at least one processor. Thus, for example, the video stabilizing apparatus 100 may be included in a microprocessor or in another type of hardware devices such as a general-use computer system.

The video stabilizing apparatus 100 may correspond to a processor included in the camera 10 of FIG. 1, or may be included in a relevant device that receives an image from the camera 10 via a wired or wireless network and receives a sensing value from a gyro sensor included in the camera 10.

Referring to FIG. 3, the video stabilizing apparatus 100 may include a feature point detector 110, a feature point tracker 120, a motion estimator 130, a motion corrector 140, a feature point location predictor 150, a feature point verifier 160, and a parameter updater 170.

The video stabilizing apparatus 100 may detect and extract a feature point from an image captured by the camera 10, track the feature point, estimate image motion based on movement of the feature point, and correct the image motion to thereby finally output a stabilized image.

The video stabilizing apparatus 100 may predict a location of a feature point based on an angular velocity of the camera 10 rotating about at least one axis, which may be sensed by a gyro sensor, and verify whether the feature point is properly tracked. A parameter stored in a memory may be used for predicting a location of a feature point based on angular velocity, and the parameter is updated in real time based on estimated image motion and the angular velocity of the camera 10. Hereinafter, the elements of the video stabilizing apparatus 100 will be described in detail.

The feature point detector 110 may detect a feature point from a first frame of a video recorded by a camera. For example, the feature point detector 110 may detect a point located in an area satisfying a preset condition in the first frame as a feature point. For example, the area satisfying a preset condition may be an edge area in which a difference of a pixel value between adjacent pixels exceeds a threshold value. Alternatively, the area satisfying a preset condition may be an area including a pattern which matches a pre-stored pattern.

The feature point detector 110 may detect a plurality of feature points from the first frame.

The feature point tracker 120 may track movement of the feature point between the first frame and a second frame. For example, the feature point tracker 120 may detect, from the second frame, a feature corresponding to the feature point detected from the first frame. The feature point tracker 120 may detect a feature point from the second frame in the same manner in which the feature point detector 110 detects a feature point from the first frame.

The second frame may come after the first frame on a timeline. For example, the second frame may be a next frame immediately following the first frame. Alternatively, for example, the second frame may be a frame which comes after five another frames following the first frame.

When a plurality of feature points are detected from the first frame, the feature point tracker 120 may detect feature points respectively corresponding to the plurality of feature points, from the second frame.

The motion estimator 130 may track image motion based on a location of a feature point in a first frame detected by the feature point detector 110 and a location of a feature point in a second frame detected by the feature point tracker 120. For example, the motion estimator 130 may estimate a motion vector of an image based on a vector starting from the location of the feature point in the first frame and ending at the location of the feature point in the second frame.

When a plurality of feature points are detected, the motion estimator 130 according to an exemplary embodiment estimates image motion based on locations of a plurality of feature points in a first frame detected by the feature point detector 110 and locations of a plurality of feature points in a second frame detected by the feature point tracker 120. For example, the motion estimator 130 may acquire vectors starting from each of the plurality of feature points in the first frame and ending at a corresponding feature point in the second frame, and estimate image motion based on an average of the vectors.

The motion corrector 140 may perform motion correction to remove, from an image, image motion estimated by the motion estimator 130 and output a stabilized image. For example, the motion corrector 140 may remove image motion between a first frame and a second frame by shifting the second frame in the opposite direction from the direction of the image motion.

Hereinafter, a method of processing data by the feature point location predictor 150, the feature point verifier 160, and the parameter updater 170 based on an angular velocity value sensed by a gyro sensor included in the camera 10 or included in a support of the camera 10 to sense a rotational angular velocity of the camera 10 will be described. Also, a data processing method performed by the motion estimator 130 related to the above method will be described.

The feature point location predictor 150 may predict a location of a feature point in a second frame using a parameter stored in a memory and an angular velocity of the camera 10 rotating about at least one axis, which may be sensed by a gyro sensor. The feature point location predictor 150 may receive an angular velocity of the camera 10 sensed by the gyro sensor.

The parameter may represent a relationship between an average angular velocity of the camera 10 during a time interval between a first frame and a second frame and corresponding pixel movement between the first and second frames. The parameter, the angular velocity, and the pixel movement may be expressed by Equation 1 below.

$$P = \alpha \times \omega \qquad \text{[Equation 1]}$$

In Equation 1, α denotes a parameter, P denotes pixel movement between a first frame and a second frame, and ω denotes an average angular velocity of the camera 10 during a time interval between the first and second frames. The camera 10 may rotate in a horizontal direction and/or a vertical direction. Each of P, ω, and α may be a matrix including a horizontal component and a vertical component, and may be expressed by Equations 2 through 4 as below.

$$P = \begin{bmatrix} Px \\ Py \end{bmatrix} \quad \text{[Equation 2]}$$

Here, Px denotes pixel movement in an x-axis direction (e.g., a horizontal direction), and Py denotes pixel movement in a y-axis direction (e.g., a vertical direction).

$$\omega = \begin{bmatrix} \omega_x \\ \omega_y \end{bmatrix} \quad \text{[Equation 2]}$$

Here, $\omega x$ denotes a rotational angular velocity in an x-axis direction, that is, a panning angular velocity, and $\omega y$ denotes a rotational angular velocity in a y-axis direction, that is, a tilting angular velocity.

$$\alpha = \begin{bmatrix} \alpha_x & 0 \\ 0 & \alpha_y \end{bmatrix} \quad \text{[Equation 4]}$$

Here, $\alpha_x$ denotes a parameter corresponding to an x-axis direction, and $\alpha_y$ denotes a parameter corresponding to a y-axis direction.

The feature point location predictor 150 may receive an angular velocity $\omega$ of the camera 10 sensed by a gyro sensor, and predicts pixel movement P of a feature point between the first and second frames by multiplying the angular velocity $\omega$ by the parameter $\alpha$, using Equation 1. Then, the feature point location predictor 150 may add the predicted pixel movement P of the feature point to a location of the feature point detected from the first frame, thereby predicting a location of the feature point in the second frame.

The gyro sensor may sense an instantaneous rotational angular velocity of the camera 10 periodically. The time intervals for sensing the angular velocity of the gyro sensor may be shorter than a time interval between the first and second frames.

The feature point location predictor 150 may receive, from the gyro sensor, a plurality of instantaneous angular velocities that are consecutively sensed between a time t1 when the first frame is captured and a time t2 when the second frame is captured. The feature point location predictor 150 may calculate an average of the plurality of instantaneous angular velocities, and substitutes the average angular velocity into Equation 1. As a result, by multiplying the average angular velocity by a parameter, pixel movement of the feature point may be predicted. Moreover, by adding the predicted pixel movement of the feature point to the location of the feature point detected from the first frame, the feature point location predictor 150 may predict a location of the feature point in the second frame.

As described above, each of the angular velocity, the parameter, and the pixel movement may be a matrix having components corresponding to two axis directions. Therefore, pixel movement in each of the two axis directions may be predicted based on a computation described above, and further a location of the feature point in the second frame may be predicted by adding the predicted pixel movement in each of the two axis directions to a location of the feature point detected from the first frame.

If the camera 10 is zoomed in or out, i.e., if a focal length of a lens of the camera 10 is changed, pixel movement according to an angular velocity of the camera 10 is also changed. In other words, the parameter described above is dependent on a lens focal length of the camera 10. For example, as the camera 10 is zoomed in, i.e., as a lens focal length is increased, pixel movement according to the same rotational angular velocity of the camera 10 may be increased. To reflect the dependency of the parameter on the lens focal length of the camera 10, a lens focal length may be used as a variable in Equation 1, or a relationship formula between the focal length and the parameter may be additionally defined. For example, a relationship formula or a lookup table regarding a relationship between the lens focal length and the parameter may be preset in a way that the parameter value increases as the focal length increases.

The feature point verifier 160 may verify a feature point based on a comparison between the location of the feature point in the second frame detected by the feature point tracker 120 and the location of the feature point in the second frame predicted by the feature point location predictor 150.

For example, the feature point verifier 160 may determine that verification of a feature point is successful when a distance between a location of the feature point in the second frame detected by the feature point tracker 120 and a location of the feature point in the second frame predicted by the feature point location predictor 150 is within an error range. On the other hand, if the distance between the location of the feature point in the second frame detected by the feature point tracker 120 and the location of the feature point in the second frame predicted by the feature point location predictor 150 exceeds the error range, the feature point verifier 160 determines that verification of the feature point failed.

A method of verifying a feature point performed by the feature point verifier 160 is not limited to the above example, and may vary in exemplary embodiments.

When a plurality of feature points are detected and predicted, the feature point verifier 160 may verify each of the plurality of feature points.

According to a result of verifying feature points as described above, the motion estimator 130 may estimate motion of an image based on the location of a feature point that is successfully verified from among the feature points detected from the second frame and the location of the corresponding feature point detected from the first frame. In detail, the motion estimator 130 may estimate image motion based on a sum of vectors that start from the location of the feature points that are successfully verified from among the entire feature points detected from the second frame to the location of the corresponding feature points detected from the first frame. The image motion may include horizontal and vertical components, and may be expressed as a matrix or a vector.

The parameter updater 170 according to an exemplary embodiment may update a parameter by using the image motion estimated by the motion estimator 130. The parameter updater 170 may update the parameter using the image motion estimated by the motion estimator 130 and an angular velocity of the camera 10 sensed by the gyro sensor. For example, the parameter updater 170 may update the parameter based on a ratio of estimated image motion to a received angular velocity, using Equation 5 below.

$$\alpha = \frac{GMV}{\omega} \qquad \text{[Equation 5]}$$

Here, a global movement vector (GMV) denotes image motion estimated by the motion estimator 130 and may be a matrix including a horizontal component and a vertical component.

That is, the parameter updater 170 may calculate a parameter representing a relationship between an angular velocity and pixel movement, based on image motion, which is estimated using pixel movement of a feature point, and an angular velocity sensed by a gyro sensor, and update a parameter value stored in a memory.

The parameter updater 170 may replace a previous parameter with a new parameter that is calculated according to Equation 5.

Alternatively, the parameter updater 170 may calculate an average of a preset (e.g. predetermined) number of recent new parameters, and update a previous parameter with an average of the recent new parameters. To this end, the parameter updater 170 may secure a memory space to store the preset number of parameters, and store all of the newly calculated parameters in the memory space. Then the preset number of parameters may be averaged to update a parameter used in predicting a location of a feature point. The preset number may be, for example, 100, but is not limited thereto.

Figure 4:
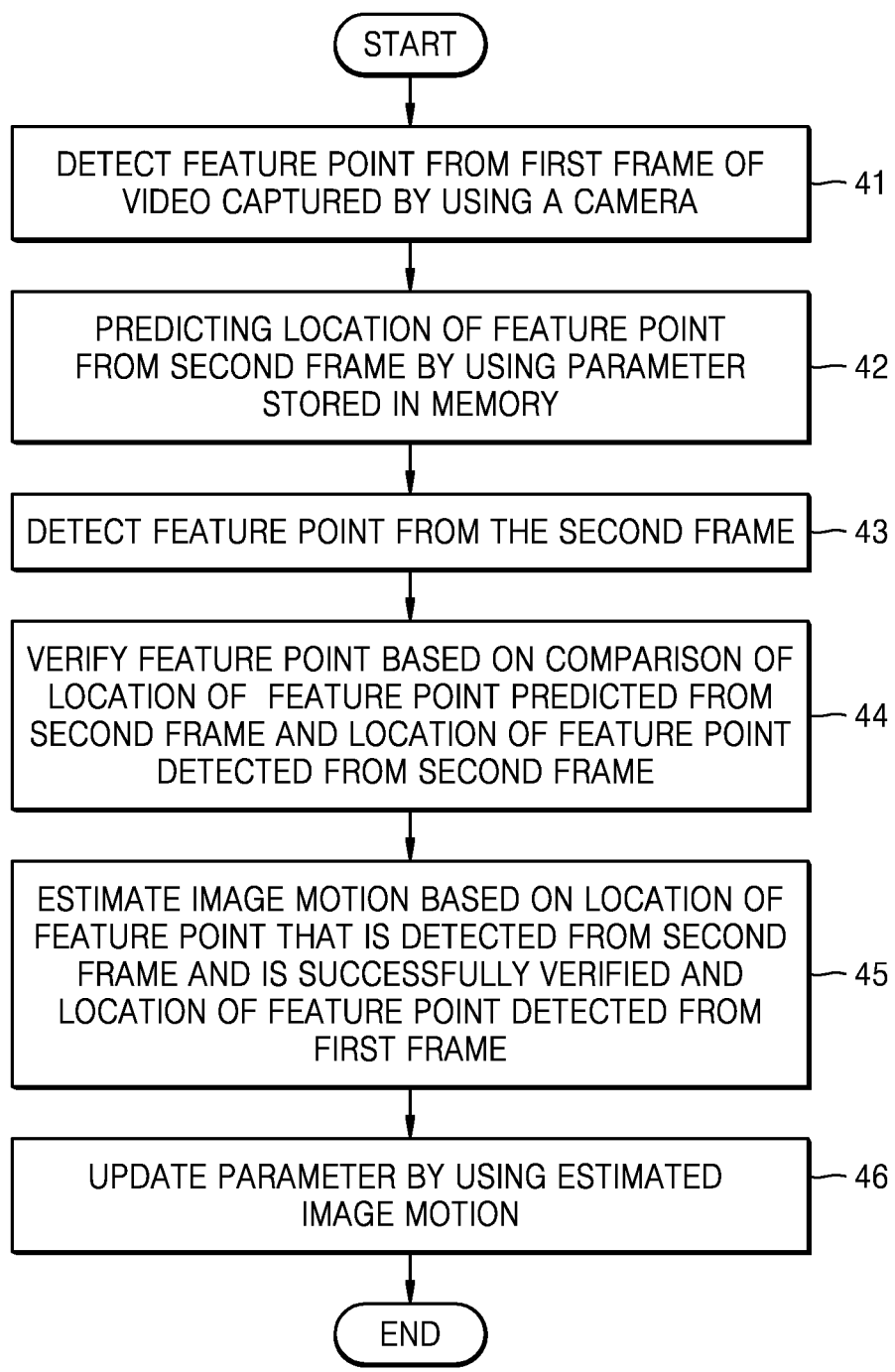
FIG. 4 is a flowchart illustrating a method of estimating image motion, according to an exemplary embodiment.

FIG. 4 is a flowchart illustrating a method of estimating image motion, according to an exemplary embodiment.

The method illustrated in FIG. 4 may include operations performed by the video stabilizing apparatus 100 illustrated in FIG. 3. Thus, description of the elements provided above with reference to FIG. 3 may also apply to the method illustrated in FIG. 4.

Referring to FIG. 4, in operation 41, the feature point detector 110 may detect a feature point from a first frame of a video recorded by the camera 10. In operation 41, the feature point detector 110 may detect a plurality of feature points.

In operation 42, the feature point location predictor 150 may predict from a second frame a location of a feature point corresponding to the feature point detected in operation 41, using a parameter. This parameter may be stored in a memory or received from an external device. Initial value for the parameter may be set by the manufacturer of the camera 10, determined by a user, or randomly chosen by the camera. In operation 42, the feature point location predictor 150 may predict from the second frame a location of a plurality of feature points corresponding to the plurality of feature points detected from the first frame in operation 41.

In operation 43, the feature point tracker 120 may detect from the second frame a feature point corresponding to the feature point detected in operation 41. In operation 43, the feature point tracker 120 may detect from the second frame feature points respectively corresponding to the plurality of feature points detected from the first frame in operation 41.

In operation 44, the feature point verifier 160 may verify a feature point, based on a comparison of the location of the feature point of the second frame predicted in operation 42 and the location of the feature point of the second frame detected in operation 43. In operation 44, the feature point verifier 160 may verify feature point based on a comparison of the locations of the plurality of feature points of the second frame which are predicted in operation 42 and the locations of the plurality of feature points of the second frame which are detected in operation 43.

In operation 45, the motion estimator 130 may estimate image motion based on a location of at least one feature point which is verified successfully in operation 44. Specifically, with respect to the verified feature point, the location detected in the first frame and the location detected in the second frame may be used to estimate the image motion.

In operation 46, the parameter updater 170 may update the parameter using the image motion estimated in operation 45.

The operations illustrated in FIG. 4 may be performed in a different order in exemplary embodiments.

Figure 5:
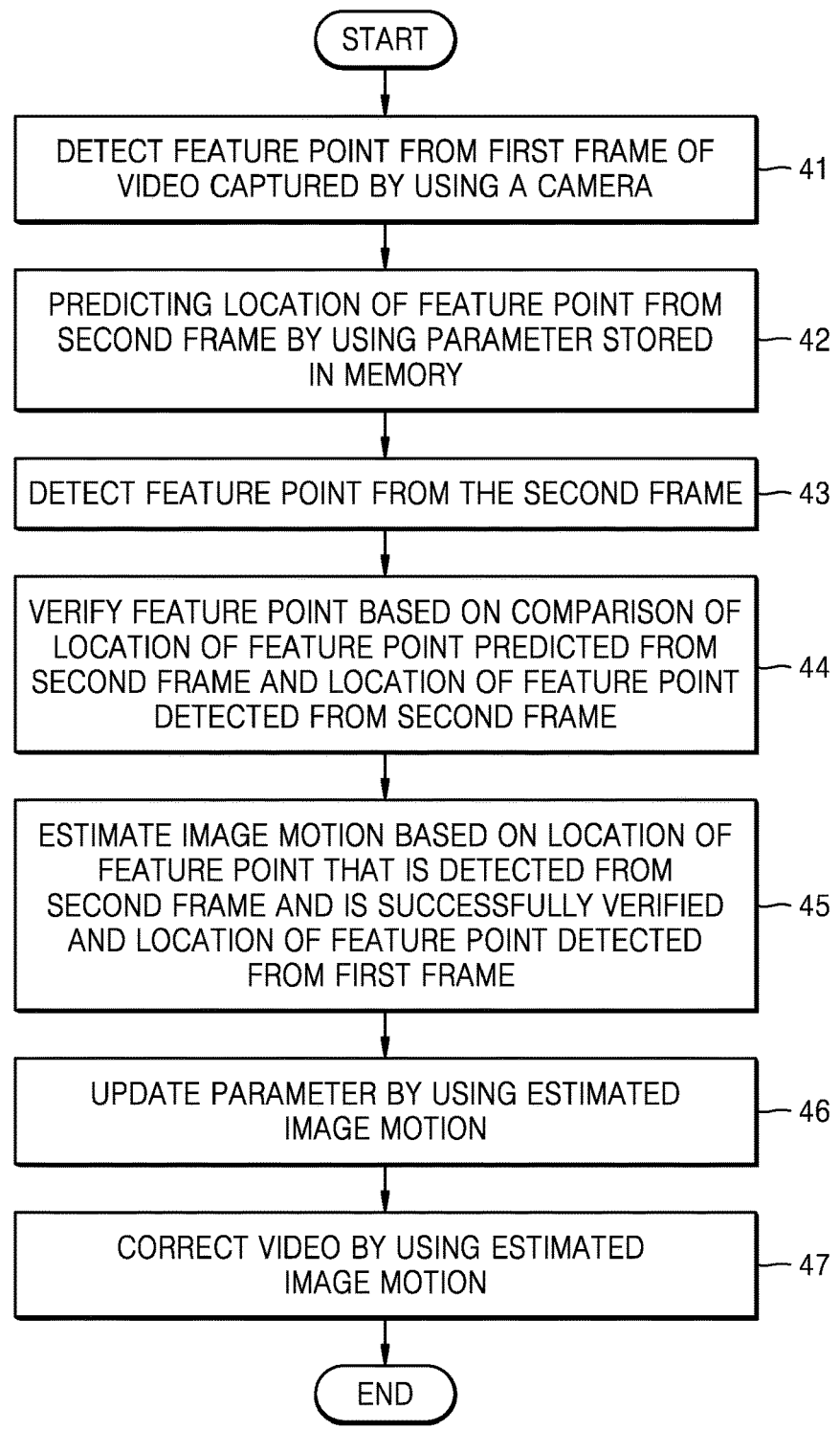
FIG. 5 is a flowchart illustrating a method of video stabilizing a video, according to an exemplary embodiment.

FIG. 5 is a flowchart illustrating a method of video stabilizing a video, according to an exemplary embodiment.

The method illustrated in FIG. 5 may include operations performed by the video stabilizing apparatus 100 illustrated in FIG. 3. Thus, description of the elements provided above with reference to FIG. 3 may also apply to the method illustrated in FIG. 5. Also, the method illustrated in FIG. 5 includes operations 41 through 46 which are similar to those illustrated in FIG. 4, so description of the operations 41 through 46 will not be repeatedly described here.

Referring to FIG. 5, in operation is added to the method of FIG. 4.

In operation 47, the motion corrector 140 of FIG. 3 may correct the video based on image motion estimated in operation 45. In detail, the motion corrector 140 may remove the image motion, which is estimated in operation 45, from the second frame to stabilize the video.

The operations illustrated in FIG. 5 may be performed in a different order in exemplary embodiments.

Figure 6:
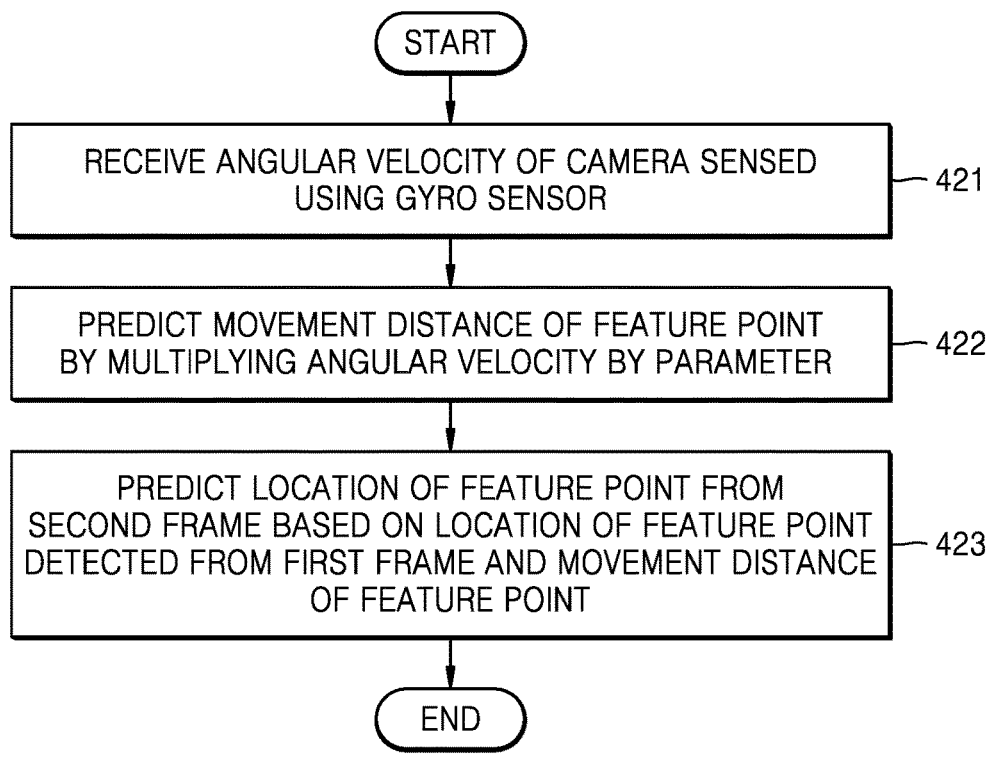
FIG. 6 is a flowchart illustrating a method of predicting a location of feature point using a parameter, according to an exemplary embodiment.

FIG. 6 is a flowchart illustrating a method of predicting a location of feature point using a parameter, according to an exemplary embodiment.

Referring to FIG. 6, in operation 421, the feature point location predictor 150 of FIG. 3 may receive an angular velocity of the camera 10 sensed by the gyro sensor included in the camera 10.

In operation 422, the feature point location predictor 150 may predict pixel movement of a feature point by multiplying the angular velocity received in operation 421 by a parameter. The parameter may be stored in a memory or received from an external device.

In operation 423, the feature point location predictor 150 may predict a location of the feature point in a second frame based on a location of the feature point detected from the first frame and the pixel movement of the feature point predicted in operation 422.

When a plurality of feature points are detected from the first frame, operation 423 is performed for each of the feature points.

Figure 7:
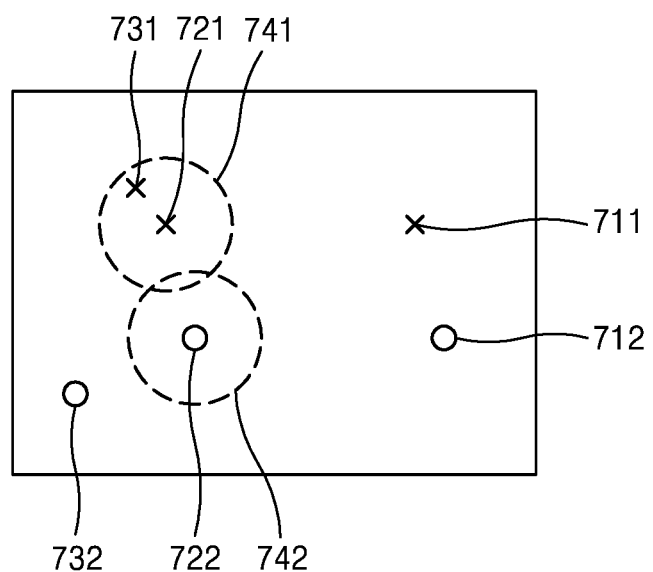
FIG. 7 illustrates a method of predicting a location of a feature point, according to an exemplary embodiment.

FIG. 7 illustrates a method of predicting a location of a feature point, according to an exemplary embodiment. In detail, FIG. 7 illustrates locations of two feature points in a first frame, which are extracted by the feature point detector 110 of FIG. 3, locations of the feature points in a second frame, which are predicted by the feature point location predictor 150 of FIG. 3, and locations of the feature points in the second frame, which are detected by the feature point tracker 120 of FIG. 3.

Referring to FIG. 7, "X" denotes a first feature point and "O" denotes a second feature point. First, with regard to the first feature point, a location 711 detected from the first frame, a location 721 predicted from the second frame, and a location 731 detected from the second frame are illustrated. Also, with regard to the second feature point, a location 712 detected from the first frame, a location 722 predicted from the second frame, and a location 732 detected from the second frame are illustrated in FIG. 7.

In regard to the first feature point, a distance between the location 731 detected from the second frame and the location 721 predicted in the second frame is within a predetermined distance 741 representing a margin of error. On the other hand, in regard to the second feature point, a distance between the location 732 detected from the second frame and the location 722 predicted in the second frame exceeds the predetermined distance 742.

In this case, the feature point verifier 160 of FIG. 3 may determine that the first feature point is properly and successfully tracked. In other words, the first feature point is verified successfully. On the other hand, the feature point verifier 160 determines that the second feature point is not correctly being tracked, and subsequently, that tracking of the second feature point failed. In other words, the second feature point is not verified.

Also, in this case, the motion estimator 130 of FIG. 3 may estimate image motion using only the first feature point, which was successfully verified. In detail, the motion estimator 130 may estimate a motion vector of the video based on a vector of the first feature point, which starts from the location 711 detected in the first frame toward the location 731 detected from the second frame. When a plurality of feature points are successfully verified, the motion estimator 130 may calculate a vector for each of the plurality of feature points, and estimate a motion vector of an image based on a vector sum of the calculated vectors.

The exemplary embodiments described above may be applied to any camera shaking or image blur generated due to an external factor such as an image processing system, a robot system, an automobile system, a national defense system, a closed circuit TV (CCTV) system, a smart phone, or a camcorder.

According to the exemplary embodiments, no complicated mathematical formula is required to predict a location of a feature point using an angular velocity sensed by a gyro sensor, and the location of the feature point is quickly and accurately predicted using an accurate parameter that may be updated in real time.

According to the method and apparatus for estimating image motion, the method and apparatus for stabilizing an image, and a computer-readable recording medium of one or more exemplary embodiments, image motion may be quickly and accurately estimated to stabilize an image.

At least one of the components, elements, modules or units represented by a block as illustrated in FIG. 3 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The methods illustrated in FIGS. 4 through 6 may be created as programs which can be executed by computers and may be implemented in a general digital computer operating the programs by using a computer-readable recording medium. The computer-readable medium may include storage mediums such as a magnetic storage medium (e.g., a ROM, a floppy disk, a hard disk, or the like), an optical reading medium (e.g., a CD-ROM, a DVD, or the like).

While this inventive concept has been particularly shown and described with reference to exemplary embodiments thereof, it will be understood by those of ordinary skill in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of the inventive concept but by the appended claims, and all differences within the scope will be construed as being included in the present inventive concept.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While the exemplary embodiments have been described with reference to the figures, it will be understood by those of ordinary skill in the art that various changes in form and details may be made therein without departing from the spirit and scope of the inventive concept as defined by the following claims.

What is claimed is:

1. A method performed by an apparatus for stabilizing a video, the method comprising:
   detecting a feature point from a first frame;
   predicting a location of the feature point in a second frame based on a location of the feature point in the first frame and a predetermined parameter;
   detecting the feature point from the second frame;
   determining a distance between the predicted location of the feature point in the second frame and a location of the feature point detected from the second frame; and
   updating the predetermined parameter based on a location difference between the feature point detected in the first frame and the feature point detected in the second frame, in response to determining that the distance is within a predetermined threshold,
   wherein the video is recorded by a camera which is rotatable in at least one axis direction,
   wherein the predetermined parameter indicates a relationship between an angular velocity of the camera, which is measured between a time point when the first frame is captured and a time point when the second frame is captured, and pixel movement between the first frame and the second frame, and wherein the predicting comprises:

acquiring the angular velocity of the camera, the angular velocity being sensed by a gyro sensor;

estimating the location difference by multiplying the angular velocity by the predetermined parameter; and predicting the location of the feature point in the second frame based on the location of the feature point detected from the first frame and the estimated location difference.

2. The method of claim 1, wherein the updating comprises updating the predetermined parameter based on the angular velocity.

3. The method of claim 2, wherein the updating comprises:

calculating a new parameter based on the location difference and the angular velocity; and updating the predetermined parameter with the new parameter.

4. The method of claim 2, wherein the updating comprises updating the predetermined parameter based on a ratio of the location difference to the angular velocity.

5. The method of claim 2, wherein the updating comprises:

calculating an average of a preset number of recent parameters which are calculated based on the location difference and the angular velocity at different time points; and updating the predetermined parameter with the average of the preset number of recent parameters.

6. The method of claim 1, wherein the acquiring comprises receiving a plurality of instantaneous angular velocities of the camera that are consecutively sensed between a time point when the first frame is captured and a time point when the second frame is captured, and wherein the determining a location difference comprises calculating an average angular velocity of the plurality of instantaneous angular velocities and multiplying the average angular velocity by the predetermined parameter.

7. The method of claim 1, wherein the predetermined parameter is dependent on a focal length of the camera.

8. The method of claim 1, wherein the detecting of the feature point from the first frame, the predicting, the detecting of the feature point from the second frame, the determining, and the updating are performed regarding a plurality of feature points comprising the feature point.

9. The method of claim 8, wherein the updating comprises estimating the location difference based on a vector defined by the location of the feature point detected from the second frame and the location of the feature point detected from the first frame.

10. The method of claim 1, further comprising correcting the video based on the location difference.

11. An apparatus for stabilizing a video, the apparatus comprising:

at least one processor configured to implement:

a feature point detector configured to detect a feature point from a first frame;

a feature point location predictor configured to predict a location of the feature point in a second frame based on a location of the feature point in the first frame and a predetermined parameter;

a feature point tracker configured to detect the feature point from the second frame;

a feature point verifier configured to determine a distance between the predicted location of the feature point in the second frame and a location of the feature point detected from the second frame;

a motion estimator configured to determine a location difference between the feature point detected in the first frame and the feature point detected in the second frame; and an updater configured to update the predetermined parameter based on the location difference in response to the feature point verifier determining that the distance is within a predetermined threshold, wherein the video is recorded by a camera which is rotatable in at least one axis direction, wherein the predetermined parameter indicates a relationship between an angular velocity of the camera, which is measured between a time point when the first frame is captured and a time point when the second frame is captured, and pixel movement between the first frame and the second frame, and wherein the feature point location predictor is further configured to:

acquire the angular velocity of the camera, the angular velocity being sensed by a gyro sensor;

estimate the location difference by multiplying the angular velocity by the predetermined parameter; and predict the location of the feature point in the second frame based on the location of the feature point detected from the first frame and the estimated location difference.

12. The apparatus of claim 11, wherein the at least one processor is further configured to implement a motion corrector configured to correct the video based on the location difference.

13. A non-transitory computer-readable recording medium having recorded thereon a program for executing the method of claim 1.

* * * * *